Nov. 12, 1957  S. RENAUD  2,812,667
GEARBOX
Filed Oct. 7, 1955  2 Sheets-Sheet 1

INVENTOR.
SAMUEL RENAUD
BY
Reynolds, Beach & Christensen
ATTORNEYS

Nov. 12, 1957 S. RENAUD 2,812,667
GEARBOX
Filed Oct. 7, 1955 2 Sheets-Sheet 2
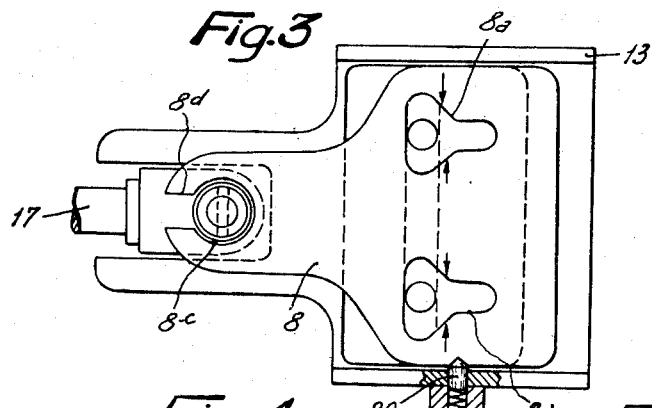
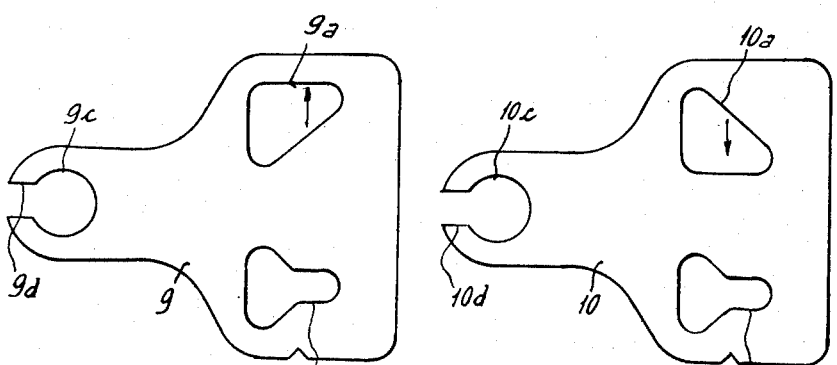
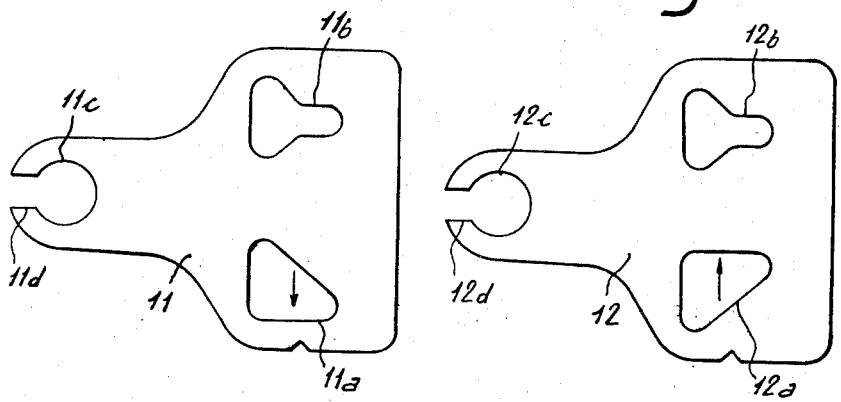
INVENTOR.
SAMUEL RENAUD
BY
Reynolds, Beach & Christensen
ATTORNEYS

United States Patent Office 2,812,667
Patented Nov. 12, 1957

2,812,667
GEARBOX

Samuel Renaud, Dijon (Cote d'Or), France, assignor to Etablissements Terrot, Dijon, France, a company Application October 7, 1955, Serial No. 539,239

Claims priority, application France January 7, 1955

7 Claims. (Cl. 74—334)

The present invention relates to gearboxes and, more particularly, to gearboxes of the sliding change pinion type.

One object of the invention is to provide a gearbox of the aforesaid type in which provision is made for a preselecting member which not only permits preselecting any desired speed but also makes it possible to set the gearbox under condition for positive return into neutral whatever may be the speed previously in operation.

Another object of the invention is to provide speed selecting means which are quite reliable and simple in construction, and compact.

Figure 1:
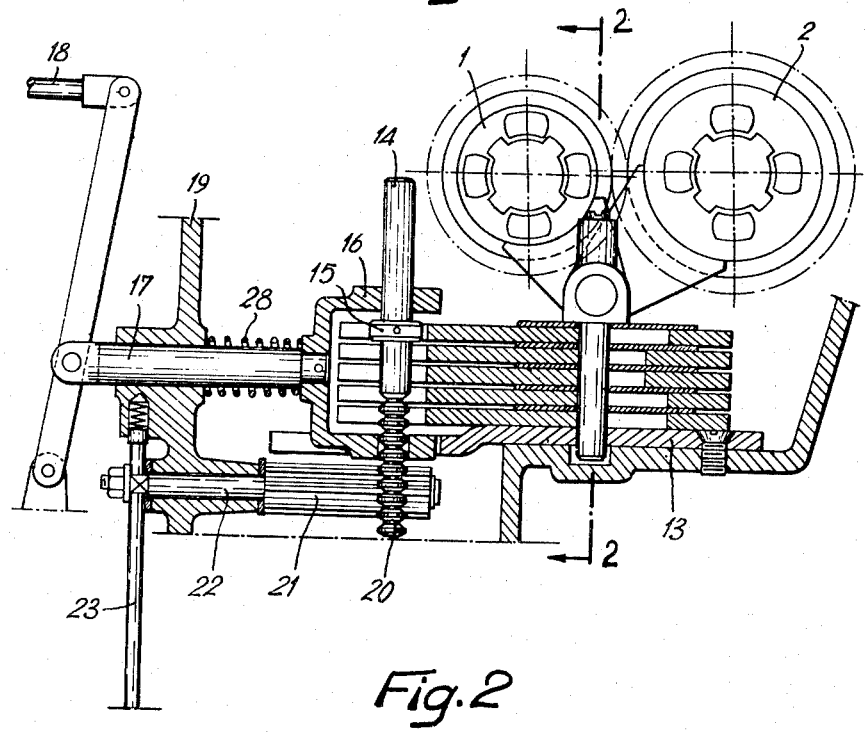
Figure 2:
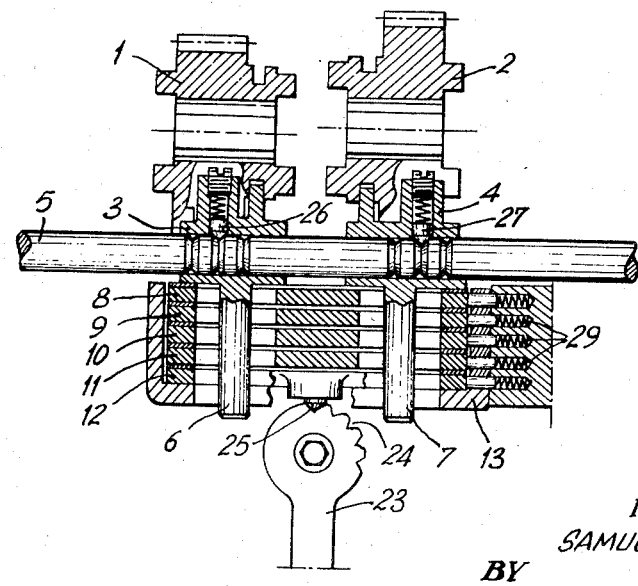

Other and further objects and advantages of the invention will be apparent to those skilled in the art, from a consideration of the following description of one specific embodiment of the invention, shown by way of example, in the accompanying drawings in which:

Fig. 1 is a fragmentary sectional view of a gearbox according to the invention, the plane of the figure being at right angles to the axial plane of the vehicle, Fig. 2 is a section taken substantially along the line 2—2 of Fig. 1, with some portions taken away, and Figs. 3 to 7 are plan views of the neutral, first, second, third, and top speed grids respectively.

Referring now more particularly to the drawings, 1 is a first and second-speed sliding pinion controlled by a fork 3 for movement in opposite senses from a neutral position into one or the other such speed position, and 2 is a third and top-speed sliding pinion controlled by another fork 4 for like movement. Each fork 3 and 4 is adapted to slide independently from each other on a rod 5 and is rigid with a finger 6 and 7 respectively.

A set of five grids 8, 9, 10, 11, 12 are stacked in parallel planes and guided in a suitable support 13 for individual to-and-fro movement, each in its own plane, in a direction at right angles to the rod 5.

In the example illustrated, each grid is constituted by a plate generally rectangular in shape and having an extension formed into a driving tail. The peripheral outline and thickness are identical for each grid and the gap between any two adjacent grids is uniform.

There being, in the present example, four active grid plates and one neutral plate, the plates which constitute the grids are each formed with two apertures the outline of which varies from one grid to another, and arranged in two sets in each whereof the apertures are in registry. In the example illustrated, both apertures 8a and 8b through the neutral grid 8 (Fig. 3) are identical and T-shaped with double slope while through grids 9 to 12 inclusive (Figs. 4—7) one of the apertures, namely 9b, 10b, 11b, 12b, is similarly substantially T-shaped with a double slope whereas the other aperture, namely 9a, 10a, 11a, 12a, is in the shape of a right-angled triangle with rounded corners, the hypotenuse of which forms a slope.

The grids differ from one another only by the arrangement and location of the apertures on each particular grid.

The T-shaped apertures are all identical in shape and oriented in like manner, their narrow stem portion having parallel edges, while their wider cross-arm portion has the two slopes directed inwardly toward the stem. The cross-arm portion is, in all the T-shaped apertures, at the side which leads as the grid plate moves from its inactive position, as will shortly be made clear.

The triangular apertures each have one short side nearer the driving tail, the other short side being parallel with the axis of the grid, and with its direction of movement, while the slope-forming hypotenuses are differently located and oriented on each particular grid.

It will be readily seen from the drawing that, in the example described and illustrated, the following five combinations are provided, looking at the grids from above in a direction at right angles to the rod 5:

Neutral grid 8: two T-shaped apertures, one in each set of apertures;

First speed grid 9: T on the left, right-triangular aperture 9a on the right with its slope directed inwardly of the grid;

Second-speed grid 10: T on the left, right-triangular aperture 10a on the right with its slope outwardly of the grid;

Third-speed grid 11: T on the right, right-triangular aperture 11a on the left with its slope inwardly of the grid;

Fourth- or top-speed grid 12: T on the right, right-triangular aperture 12a on the left with its slope outwardly of the grid.

In all instances the one short side of the right triangular aperture leads as the grid shifts, and the other short side is parallel to the direction of movement. Furthermore, the tails of the grids are identical and each have a keyhole slot, with its wide round recess $8c \ldots 12c$, and a narrow slot $8d \ldots 12d$, with parallel edges opening into said round recess. Any of the grids may be selectively shifted within the support 13 by means of a spindle 14 on which is rigidly secured a collar 15. The spindle 14 is mounted for vertical sliding movement in a clevis 16 and extends through the recesses of the tails of the grids 8 to 12. The diameter of the spindle 14 is slightly smaller than the width of the narrow slots, whereas the diameter of the collar 15 fixed on the spindle 14 is larger than said width while somewhat smaller than the diameter of the round recesses. The thickness of the collar 15 is materially equal to that of any individual grids 8–12. Such collar on the shiftable spindle, and the cooperating keyhole slots, are to be taken as typical of any suitable interengagement between an actuator (of which the spindle and collar are a part) and any individual grid plate to be shifted thereby.

The spindle 14 may be shifted lengthwise, i. e. vertically by means of a device to be described which causes said spindle selectively to assume any one of five different positions each in the plane of a different one of the grids 8 to 12.

It results therefrom that when the collar 15 is positioned in the plane of any particular grid within the round recess of the tail of said grid, the latter becomes fixedly connected with the spindle 14 while all the other grids remain fully independent of said spindle, and the spindle and the fixedly connected grid can move relative to them. The lower portion of the clevis 16 is accommodated in an axial notch of the support 13 for the grids.

The clevis 16, which also is part of the actuator, is mounted for reciprocating movement in a direction parallel with the geometrical axis of the grids 8–12. It is operatively connected to a horizontal driving rod 17 adapted to be operated by a pedal (not shown) through a suitable transmission 18, for instance a link or a lever, which driving rod is mounted for sliding movement in a bore of the casing 19 of the gearbox.

The spindle 14, therefore, may be horizontally reciprocated in a vertical plane containing the geometrical axes of the stacked grids 8–12. In the course of such movement, the spindle 14 will carry with it, through the medium of the collar 15, the grid which is level with said ring, while leaving at rest all the other grids.

Vertical adjustment of the collar 15 level with any particular grid 8—12 is effected by means of a toothed rack 20 rigid with the spindle 14 and in mesh with the pinion 21 keyed on a shaft 22 which is journalled in a bearing fixed on the casing 19. The shaft 22 may be turned a suitable angle in the desired direction by means of a lever 23. Said lever is rigid with a sector 23 having five notches such as 24, one of which is engaged by a spring-pressed retainer bolt 25 which provides for the correct positioning of the collar 15 in register with the desired grid 8–12.

The sliding change pinions 1 and 2 may be brought in mesh respectively, on one hand, with the first and second-speed gears, and on the other hand, with the third and fourth-speed gears (not shown).

As hereinabove stated, the sliding pinions 1 and 2 are respectively controlled by the forks 3 and 4 through the driving fingers 6 and 7 which are respectively rigid with said forks and extend through the apertures of the grids in cooperation with the slopes of these apertures. The function of the fingers 6, 7 is to shift, in accordance with their own movements respectively controlled by the grids, the forks 3, 4 of the sliding pinions on the rod 5, on which they are retained in correct position by means of spring-pressed bolts 26, 27.

Furthermore, the grids 8–12 are permanently urged into a given inactive position, shown in Figures 1 and 2, by a spring 28 inserted between the casing 17 and the clevis 16.

In order that the driver be permanently aware of the conditions prevailing in the gearbox, the mechanical equipment associated with said gearbox is fitted with an indicating device (not shown) and designed as follows: the preselecting lever which actuates the shaft 22 through the medium of the lever 23, and which is positioned near the steering wheel in a car or near the handle bar in a motorcycle, carries an index adapted to move over a graduation, thus indicating at any moment which of the grids 8–12 is engaged by the collar 15.

The shifting of the grids may be obtained, among others, in two principal manners: either from the conventional clutch-pedal or by means of an additional pedal purposely provided.

The operation of the device will first be explained with reference to the first instance:

All five grids are maintained in the neutral or inactive position illustrated by the action of the spring 28 and the five spring-pressed bolts 29. Both forks 3, 4 are in neutral position. The collar 15 is level with the grid 8 (neutral position grid) and is locked in this position by the spring-pressed bolt 25.

The engine is running and the vehicle is at rest.

The index and consequently the lever 23, is brought to the first speed position, thus rotating the shaft 22 rigid with the pinion 21, the toothed rack 20 is shifted and brings the collar 15 level with the first-speed grid 9. The collar is locked at this level by the bolt 25. The clutch pedal is depressed and the arrangement is such that said pedal effects declutching the engine in the first portion of its stroke and effects operation of the link 18, rod 17 and clevis 16, in the second portion of its stroke.

Such operation, it will be understood, causes the collar 15 (Fig. 1) which is engaged in the round recess 9c of the tail of the first-speed grid 9 to shift said grid. Referring to Fig. 4, it will be readily seen that the slope of the triangular aperture 9a of the grid 9 pushes the finger 6 outwardly of the grid, which causes the fork 3 and, therefore, the sliding pinion 1, to be brought into first-speed position. As a contrast, the other portions of the spindle 14 travel freely through the narrow portions 8d, 10d, 11d, 12d, in the tails of the other grids 8, 10, 11, 12 respectively which, therefore, are left at rest.

The fork 3 is left locked in first speed position by the bolt 26.

Clutching is progressively carried out as usual and the vehicle starts on first speed. When the collar 15 shifts level with the second-speed grid 10, the grid 9 resumes its original position under the action of the spring 28.

The index having been brought to the second speed position and the second speed is selected through the grid 10, putting the sliding gear 1 in mesh with the second speed pinion of the secondary shaft. Any other speed may be obtained in the same manner, as the arrows in Figures 4 to 7 show.

It is appreciated that the operation for selecting a speed, which requires no effort and the putting of a sliding pinion into mesh with a pinion of the secondary shaft are achieved separately, when requested at the driver's will.

When an additional pedal is provided for controlling the gear box, the speeds will be changed over by conventional declutching and depressing the additional pedal.

As many changes could be made in the above construction, and many widely different embodiments of this invention could be made without departing from the scope of the claims, it is intended that all matter contained in the above description or shown in the accompanying drawings shall be interpreted as illustrative and not in a limiting sense.

Thus, the invention is applicable to any conventional gear box with one or more sliding gears, and, if need be, reverse speed gears. Furthermore, the operation of the gear box may be controlled by any other device, either automatic, mechanical, hydraulic, pneumatic or electrical.

What I claim is:

1. Change-speed mechanism comprising, in combination with a pinion shiftable axially in either sense from a neutral position to different speed positions, a plurality of distinctively apertured grid plates stacked in parallel planes, one corresponding to neutral, another to a first speed, and another to a second speed, resilient means tending to urge each grid plate into and to retain it in an inactive position, with their apertures in registry, a finger operatively connected to said pinion to shift the latter, and projecting through the apertures in the several grid plates, for cooperation with the edges of such apertures, the apertures being of such size, shape, and relative location as to permit shifting of the finger and pinion freely, so long as such grid plates are in the inactive position, a preselector device operatively engageable with any single plate at a time, but freely shiftable relative to all other grid plates at such time, and means so to engage the same, means to shift the preselector device and the so-engaged grid plate, in the plane of the latter and transversely to the axis of said pinion, the edges of the apertures which are selectively engaged with the finger by such shifting being inclined with relation to the direction of shifting, to urge the finger, and hence the pinion, axially of the latter into a position consonant with the speed that corresponds to the so-shifting grid plate.

2. Change-speed mechanism comprising, in combination with parallel pinions each shiftable axially in either sense from a neutral position to different speed positions, a plurality of distinctively apertured grid plates stacked in parallel planes, one corresponding to each different speed and one more corresponding to neutral, resilient means tending to urge all said grid plates into and to retain them in an inactive position, with their apertures in registry, a finger operatively connected to each pinion to shift the same from neutral in opposite axial senses to either of two speed positions, said finger projecting through the apertures in the several grid plates for cooperation with the edges of certain thereof, the apertures being of such size, shape, and relative location as to permit shifting of a given finger and its pinion freely, so long as such grid plates are in the inactive position, a preselector device operatively engageable with any single grid plate at a time, but freely shiftable relative to all other grid plates at such time, means to shift the preselector device and the so-engaged grid plate, in the plane of the latter and transversely to the axes of the pinions, the edges of the apertures which are selectively engaged with the finger by such shifting being inclined with relation to the direction of shifting, to urge the finger and its pinion axially of the latter into a position consonant with the speed that corresponds to the so-shifting grid plate.

3. Change-speed mechanism as in claim 1, wherein the preselector device includes an actuator shiftable into positions to engage with any single grid plate, said actuator and the several grid plates having complemental means automatically interengageable when the actuator is thus positioned, and means to shift said actuator into position to interengage with any such grid plate.

4. Change-speed mechanism as in claim 1, wherein each grid plate is key-hole-slotted, in position such that the several slots register when in the inactive position, and wherein the preselector device includes a rod extending through the slots of the several grid plates and of a diameter to move through the narrow portion of such slots, and a collar upon the rod, of a thickness equivalent to the thickness of only a single grid plate, and of a diameter to move through the larger opening of each slot, but greater than the width of the narrow portion thereof, and means to shift said rod and collar in the direction of the rod's length to bring the collar into registry with any selected grid plate.

5. The combination of claim 4, wherein said rod has one portion thereof formed as a toothed rack while said preselecting means include an elongated pinion in mesh with said rack and the axis of which extends in a direction parallel with the direction of movement of said operating means.

6. Change-speed mechanism as in claim 1, wherein the aperture in the neutral grid plate is of generally T-shape, with the cross-arm of the T located in advance during shifting of the plate by the preselector device, and the ends of the cross-arm joined to the stem by inwardly sloping edges, and wherein the first speed and second speed grid plates have apertures of generally right-triangular shape, each with one short side located in advance during shifting of the plate by the preselector device, and the other short side located parallel to the direction of shifting, but with the hypotenuse of one thereof inclined outwardly and of the other inclined inwardly, for cooperation with the finger to shift the same in respectively opposite senses.

7. Change-speed mechanism as in claim 2, wherein there are five grid plates, including the neutral plate, and each is formed with two apertures each for registry with like apertures in the other plates, and wherein there are two pinions and two fingers, one shiftable by one set of apertures and the other shiftable by the other set of apertures, the two apertures of the neutral grid plate being of generally T-shape, with the cross-arm of each T located in advance during shifting of the plate by the preselector device, and the ends of the cross-arm joined to its stem by inwardly sloping edges, to urge the corresponding fingers into neutral position, and wherein each other grid plate is formed with one aperture which is likewise of such T-shape, and its second aperture being of generally right-triangular shape, each with one short side located in advance during shifting of the plate by the preselector device, and the other short side located parallel to the direction of shifting, but with the hypotenuse of one of the two plates that cooperate with one finger inclined outwardly and that of the other of such two plates inclined inwardly, and with the hypotenuses of the two plates that cooperate with the other finger being similarly opositely inclined, the T-shaped apertures of the two grid plates first mentioned being in registry with the triangular apertures of the two grid plates last mentioned, and vice versa.

References Cited in the file of this patent
UNITED STATES PATENTS

| | | |
|---|---|---|
| 2,054,575 | Tyler | Sept. 15, 1936 |
| 2,057,810 | Alspaugh | Oct. 20, 1936 |
| 2,085,665 | Lackinger | June 29, 1937 |
| 2,173,036 | Clerk | Sept. 12, 1939 |
| 2,235,943 | Mylius | Mar. 25, 1941 |
| 2,388,043 | Derungs | Oct. 30, 1945 |
| 2,429,160 | Helmstein et al. | Oct. 14, 1947 |
| 2,434,051 | Randol | Jan. 6, 1948 |
| 2,485,034 | Bugatti | Oct. 18, 1949 |